United States Patent
Fujikawa

(10) Patent No.: US 6,390,798 B1
(45) Date of Patent: May 21, 2002

(54) INJECTION APPARATUS FOR PLUNGER-INJECTION MOLDING MACHINE HAVING AN EJECTION GUIDE

(75) Inventor: Misao Fujikawa, Ishikawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/424,777

(22) PCT Filed: Mar. 26, 1999

(86) PCT No.: PCT/JP99/01556

§ 371 Date: Nov. 30, 1999

§ 102(e) Date: Nov. 30, 1999

(87) PCT Pub. No.: WO99/50044

PCT Pub. Date: Oct. 7, 1999

(30) Foreign Application Priority Data

Mar. 30, 1998 (JP) .............................. 10-102162
Mar. 30, 1998 (JP) .............................. 10-102163

(51) Int. Cl.[7] ............................................... B29C 45/17
(52) U.S. Cl. ..................................... 425/215; 425/547
(58) Field of Search ............................... 425/215, 216, 425/217, 547, 550, 557, 560, 561

(56) References Cited

U.S. PATENT DOCUMENTS

| | | | | |
|---|---|---|---|---|
| 2,514,884 A | * | 7/1950 | Maynard | 425/156 |
| 2,965,929 A | * | 12/1960 | Smith | 425/166 |
| 3,109,198 A | * | 11/1963 | Guignard | 264/294 |
| 3,599,578 A | * | 8/1971 | Sato | 425/78 |
| 3,810,728 A | * | 5/1974 | Jacobs | 425/547 |
| 5,302,103 A | * | 4/1994 | Brown et al. | 425/150 |
| 5,770,245 A | | 6/1998 | Takizawa et al. | 425/549 |
| 5,770,246 A | | 6/1998 | Fujikawa | 425/557 |
| 6,017,210 A | * | 1/2000 | Takayama et al. | 425/557 |

FOREIGN PATENT DOCUMENTS

| | | |
|---|---|---|
| JP | 4-347614 | 12/1992 |
| JP | 8-156049 | 6/1996 |
| JP | 8-229997 | 9/1996 |
| JP | 9-85787 | 3/1997 |

* cited by examiner

Primary Examiner—Nam Nguyen
Assistant Examiner—Emmanuel Luk
(74) Attorney, Agent, or Firm—McDermott, Will & Emery; Paul Devinsky

(57) ABSTRACT

In order to eject resin leaked from an injection chamber (13) toward the shaft side of an injection plunger (31) away from an injection cylinder (30), a plunger-type injection molding machine injection device is equipped with an ejection guide (151, 251) at the rear edge of an injection cylinder which is thermally isolated from the injection cylinder main body. A band heater (53), which heats the ejection guide, is controlled independently of the band heater (38) which heats the injection cylinder. One embodiment of this injection guide (151) causes the ejected resin to fall from the ejection opening (151h) while retaining its molten state. In another embodiment, the ejection guide (251) has ejection channels (251f) which cause the resin to harden and be ejected in a fine strand state.

5 Claims, 5 Drawing Sheets

INJECTION APPARATUS FOR PLUNGER-INJECTION MOLDING MACHINE HAVING AN EJECTION GUIDE

TECHNICAL FIELD

The present invention relates to an injection device for a plunger-type injection molding machine which injects a molten resin by means of an injection plunger. More specifically, the present invention relates to an injection device for a plunger-type injection molding machine equipped with a resin ejection opening, which reliably ejects the resin which, during the injection operation, has leaked out of the injection chamber to the area around the injection plunger shaft, from the rear edge of the injection cylinder.

BACKGROUND

Plunger-type injection molding machines supply molten molding resin to an injection device, and inject it into a molding die with an injection plunger. In practice, plunger-type injection molding machines are frequently used as a screw preplasticizing injection molding machine; therefore the explanation below refers to a screw preplasticizing injection molding machine.

A conventional screw preplasticizing injection molding machine contains a plasticizing screw within a plasticizing chamber in a plasticizing section; an injection plunger is contained within an injection chamber in an injection section, and a connecting path is provided between the plasticizing section and the injection section which connects the plasticizing chamber and the injection chamber. A synthetic resin material (hereinafter "resin") supplied from a hopper is blended and melted, which is to say plasticized, within the plasticizing chamber by means of the rotation of a plasticizing screw and the heat of the plasticizing chamber, and is pressure fed to the injection chamber through the connecting path. At this point, the stoke of retraction of the injection plunger which retracts with the pressure feed is detected, and the amount of molten resin is measured (metered). Next, the injection plunger advances, and the molten resin is injected into a cavity in the die.

In such a plunger-type injection molding machine, in order to ensure that the injection plunger does not bite into the injection cylinder during injection, a minute gap exists between the plunger head and the injection cylinder inner wall. Also, the injection plunger shaft has a slightly smaller diameter than the injection plunger head, and a step is formed between the plunger head and the plunger shaft. Therefore, during the injection operation, in which molten resin is filled at high pressure into a die, an extremely small amount of molten resin leaks out of the gap between the plunger head and the injection cylinder inner wall and accumulates in the gap between the plunger shaft and the injection cylinder inner wall. Resin which thus leaks out (hereinafter "leaked resin") is pressed into the aforementioned step with each retraction of the plunger head and is pushed backward, such that it is continuously ejected from the rear (base) portion of the injection cylinder, or from a resin ejection opening provided near the rear edge of the injection cylinder. However, when this leaked resin has not been perfectly ejected, the leaked resin is further compressed with each injection by the leaked resin, forming a dam, and the retraction of the injection plunger is prevented, thus impeding the metering operation.

Several injection devices equipped with resin ejection openings with which the leaked resin could be ejected outside the injection cylinder have thus been proposed. For example, Jpn. Patent H8-156049 discloses an injection device equipped with a scraper ring, which supports an injection plunger as well as scrapes off ejected resin which has adhered and emerged around the injection plunger shaft. In Jpn. Patent H8-229997, an injection cylinder is proposed in which, in order to eject the leaked resin in the molten resin state, a resin drain opening is provided directly on the injection cylinder, while at the same time a heater is added to the injection cylinder behind that drain opening. Jpn. Patent H9-85787 proposes, in addition to the structure of Jpn. Patent H8-229997, an injection device which provides a scraping sleeve immediately behind the resin drain, such that the molten resin is prevented from leaking out behind the scraping sleeve.

When molding is performed with a general use resin, such resin is thermally stable, and there is therefore no degradation even if the leaked resin is exposed over long periods to high temperatures around the plunger shaft. Therefore, if molding can be carried out while maintaining a molding temperature sufficiently above the temperature at which resin begins to melt, the leaked resin will be ejected in the molten state from the injection cylinder, and will fall from the ejection opening in the molten state.

However, depending on the type of resin used, or even with the same resin, depending on molding conditions, leaked resin is ejected in many different forms.

For example, there are many types of engineering plastics or super engineering plastic materials with narrow stable-melting molding temperature, which are easily heat decomposed; these resins are usually molded at temperture just above the lower molding temperature limit. When 2 types of plastic materials having differing melting temperatures are mixed and used as an alloy in order to improve the strength of molded products, the molding temperature is adjusted to the lower limit molding temperature of the resin having the higher molding temperature, in order to prevent degradation of the resin having the lower molding temperature. In such cases, when the molding temperature falls somewhat below the lower limit temperature, the viscosity of the molten resin can increase, or internal hardening may occur. Under such circumstances leaked resin may readily harden around the ejection opening, where the temperature can easily drop.

When imparting flame resistance or other characteristics to a resin by admixture of additives to the resin, the molten resin may become more easily thermally degraded. When molding with an extremely small injection quantity per cycle, the length of the stroke which the injection plunger moves for a molding is extremely small compared to the total motion stroke inherent to the molding machine, and the leaked resin is exposed to high temperatures around the plunger shaft for a long period before being ejected, making it prone to thermal degradation. In such cases, as well, the molten resin viscosity increases, and the resin is prone to internal hardening.

When changing materials from a high molding temperature resin to a low molding temperature resin, lowering the injection cylinder heater temperature setting from high to low temperature before the pre-changeover leaked resin has been completely ejected from the ejection opening will result in a lowered temperature at the ejection opening, such that leaked resin will harden and not fall down at the ejection opening. To avoid this, it was previously necessary to sufficiently purge until the leaked resin had been completely ejected, maintaining the injection cylinder temperature setting at the pre-changeover high temperature, requiring extra time to be added to the purging operation.

An object of the present invention is to provide an injection device which will drop the leaked resin such that it does not plug up the ejection opening even when the resin is in one of the various states described above, whereby it is prone to plug up the ejection opening. Therefore, for resin capable of being ejected in the molten state, an injection device equipped with an ejection guide capable of controlling temperature independently from that of the injection cylinder is provided in order to enable reliable ejection in the molten state. For resins prone to hardening, an injection device is provided which is equipped with an ejection guide capable of ejecting the resin by dividing it into fine strands, as well as independently controlling temperature. The above ejection guides may also be made selectively detachable/attachable in response to the resin ejection state.

SUMMARY OF THE INVENTION

A plunger-type injection molding machine injection device is provided, wherein molten resin in an injection cylinder injection chamber is injected by means of an injection plunger, the device including an ejection guide. The ejection guide having a cylindrical portion with a diameter smaller than the outside diameter of the rear edge of said injection cylinder, a flange portion, and a guide hole penetrated by an injection plunger shaft. The ejection guide including a resin ejection opening in said flange portion contacting said injection cylinder at said cylindrical portion, and being equipped at said cylindrical portion with a heating means by which temperature of said ejection guide is controlled independently of said injection cylinder, wherein the inside diameter of said guide hole on the front side of said resin ejection opening being formed so as to be approximately equal to or somewhat larger than the inside diameter of said injection cylinder, and the inside diameter of said guide hole on the rear side of said resin ejection opening being dimensioned so as to form a minute gap relative to the outside diameter of said injection plunger shaft.

By this construction the heating means controls the ejection guide temperature independently of the injection cylinder; control is executed such that leaked resin is definitively melted until it is ejected and falls from the ejection guide ejection opening. The leaked resin is ejected in a molten state, and is therefore preferable for injection devices which mold general purpose resins which are thermally stable.

Also, in another form of the plunger-type injection molding machine injection device of the present invention, a plunger-type injection molding machine injection device, in which molten resin in an injection cylinder injection chamber is injected by means of an injection plunger, includes an ejection guide having a cylindrical portion with a diameter smaller than the outside diameter of the rear edge of said injection cylinder, a flange portion, and a guide hole penetrated by an injection plunger shaft. The ejection guide contacting said injection cylinder at said cylindrical portion, said ejection guide being equipped at said cylindrical portion with a heating means by which temperature of said ejection guide is controlled independently of said injection cylinder; and a connecting piece for connecting said injection cylinder to an injection drive mechanism housing, said connecting piece having a drop opening on the bottom side thereof, wherein said ejection guide being further formed such that the inside diameter of the front side of said guide hole is approximately equal to or somewhat larger than the inside diameter of said injection cylinder, and the inside diameter of the rear side of said guide hole being formed into a cylindrical surface and dimensioned to form a minute gap relative to said plunger shaft with multiple ejection channels formed on said cylindrical surface parallel to the axis thereof.

By this construction, the heating means controls the temperature of the ejection guide independently of that of the injection cylinder. Temperature is controlled such that the fluidity of the leaked resin is maintained when the resin is in the guide hole of the ejection guide, and to the point that the leaked resin is divided into fine strands just as it is being ejected from the ejection channel. These strands harden without adhering to one another. The ejected leaked resin spreads out radially around the plunger shaft in the fine strand state and is suspended within a drop opening, finally breaking off and falling with the retraction of the plunger. This is preferable when using materials such as engineering plastics or super engineering plastics, where the molding temperature is controlled within a narrow range, or when using resin with an admixture of additives, or when molding an extremely small injection quantity per cycle.

In a plunger-type injection molding machine injection device according to yet another embodiment of the present invention, a plunger-type injection molding machine injection device, in which molten resin in an injection cylinder injection chamber is injected by means of an injection plunger, includes first and second ejection guides being attached interchangeably at a rear edge of said injection cylinder with a flange portion fastened by screws. The first ejection guide comprises an ejection guide having a cylindrical portion with a diameter smaller than the outside diameter of the rear edge of said injection cylinder, a flange portion, and a guide hole penetrated by an injection plunger shaft, said ejection guide including a resin ejection opening in said flange portion contacting said injection cylinder at said cylindrical portion, and said ejection guide being equipped at said cylindrical portion with a heating means by which temperature of said ejection guide is controlled independently of said injection cylinder, wherein the inside diameter of said guide hole on the front side of said resin ejection opening being formed so as to be approximately equal to or somewhat larger than the inside diameter of said injection cylinder, and the inside diameter of said guide hole on the rear side of said resin ejection opening being dimensioned so as to form a minute gap relative to the outside diameter of said injection plunger shaft. The second ejection guide comprises an ejection guide having a cylindrical portion with a diameter smaller than the outside diameter of the rear edge of said injection cylinder, a flange portion, and a guide hole penetrated by an injection plunger shaft, said ejection guide contacting said injection cylinder at said cylindrical portion, and said ejection guide being equipped at said cylindrical portion with a heating means by which temperature of said ejection guide is controlled independently of said injection cylinder; and a connecting piece for connecting said injection cylinder to an injection drive mechanism housing, said connecting piece having a drop opening on the bottom side thereof; wherein said ejection guide being further formed such that the inside diameter of the front side of said guide hole is approximately equal to or somewhat larger than the inside diameter of said injection cylinder, and the inside diameter of the rear side of said guide hole being formed into a cylindrical surface and dimensioned to form a minute gap relative to said plunger shaft with multiple ejection channels formed on said cylindrical surface parallel to the axis thereof.

There are at least two types of ejection guides, characterized by being interchangeable on the injection device.

Using this structure, either of the above ejection guides may be easily installed on the injection device. One of the ejection guides ejects the leaked resin in its molten state and causes it to drop, while the other ejection guide cuts the leaked resin into fine strands, ejecting it in a hard state and causing it to drop. Therefore, depending on the type of resin being molded, or even using the same resin, depending on molding conditions, it is possible to reliably eject the leaked resin in various states from the resin ejection opening and cause it to fall by installing one of the above ejection guides.

In the injection device for the plunger-type injection molding, in addition to the heating means, it is preferred that the temperature of the ejection guide is also controlled by a cooling means.

Preferably, the ejection guide is temperature controlled by a cooling means as well as by said heating means, said cooling means cooling a rear end of said flange portion with one of a nozzle or a cooling water pipe and said heating means heating said cylindrical portion with a heater.

In cases in which such a construction is adopted with respect to an ejection guide which causes the leaked resin to be ejected in the molten state, the cooling means makes it possible, depending on ejection conditions, to reliably prevent the molten resin which has been ejected from the resin ejection opening from passing through the gap between the guide hole on the rear wall of the resin ejection opening and the plunger shaft, and further leaking out to the rear. Also, when a structure such as this is adopted with respect to an ejection guide with which the leaked resin is cut into fine strands and hardens, is ejected, and falls, a cooling means can cool the fine strand resin ejected from the ejection channel such that it reliably hardens.

In a plunger-type injection molding machine injection device according to yet another embodiment of the present invention, a plunger-type injection molding machine injection device, in which molten resin in an injection cylinder injection chamber is injected by means of an injection plunger, includes an ejection guide at the rear edge of said injection cylinder; a connecting piece for connecting said injection cylinder to an injection drive mechanism housing; and a coupling for connecting said injection plunger to a linkage rod of an injection hydraulic cylinder. The connecting piece has a drop opening on the bottom side thereof, said coupling having a tapered surface on the front surface thereof; said ejection guide having a cylindrical portion with a diameter smaller than the outside diameter of the rear edge of said injection cylinder, a flange portion, and a guide hole penetrated by the said injection plunger shaft; said ejection guide contacting said injection cylinder at said cylindrical portion and being equipped at said cylindrical portion with a heating means by which temperature of said ejection guide is controlled independently of said injection cylinder; said ejection guide being further formed such that the inside diameter of the front side of said guide hole is approximately equal to or somewhat larger than the inside diameter of said injection cylinder, and the inside diameter of the rear side of said guide hole being formed into a cylindrical surface and dimensioned to form a minute gap relative to said injection plunger shaft with multiple ejection channels formed on said cylindrical surface parallel to the axis thereof.

In the injection device of the plunger-type injection molding machine, the injection cylinder is preferably connected through an insulating material at a small diameter cylindrical portion thereof to a housing for a drive means which drives the injection plunger; the ejection guide preferably includes a cylindrical portion with a smaller diameter than the outer diameter of the injection cylinder rear portion small diameter tube, connected to the small diameter cylindrical portion of the injection cylinder at the small diameter tube. this construction makes it unlikely that the temperature of the injection cylinder small diameter cylindrical portion will be directly or indirectly affected by the temperature of the injection cylinder main body. Furthermore, the ejection guide temperature is virtually unaffected by the temperature of the injection cylinder main body.

PREFERRED EMBODIMENTS OF THE INVENTION

Figure 1:
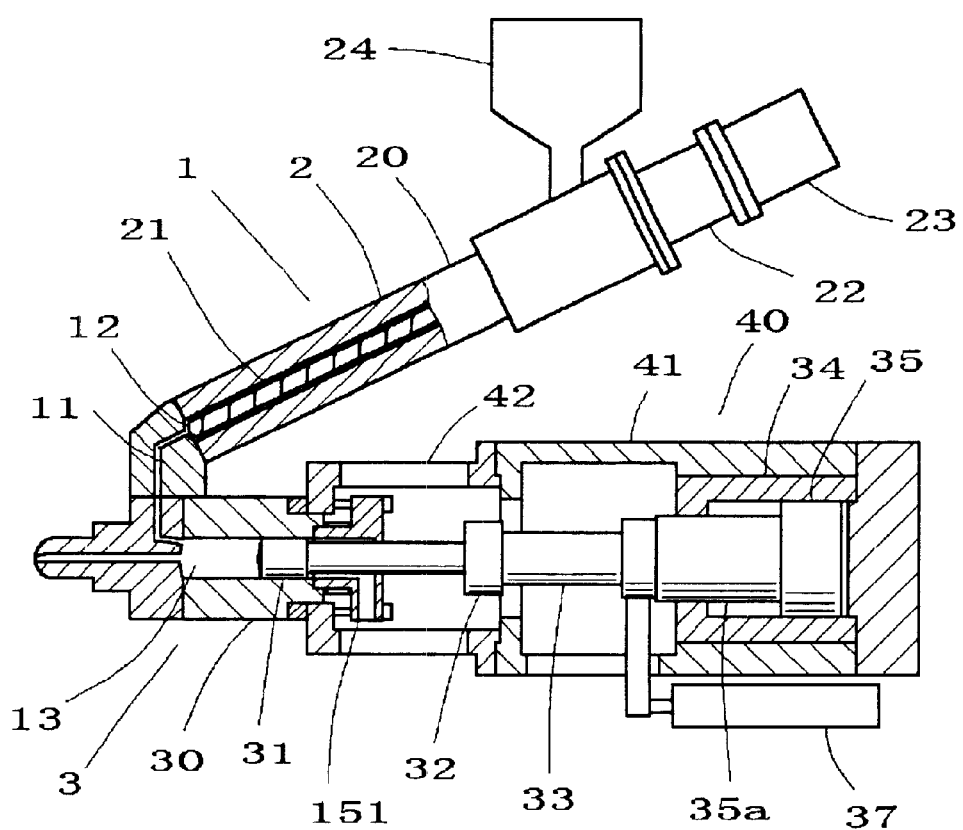
FIG. 1 is an overview diagram showing a partial section of the screw preplasticizing injection molding machine injection device according to a first embodiment of the present invention.
Figure 4:
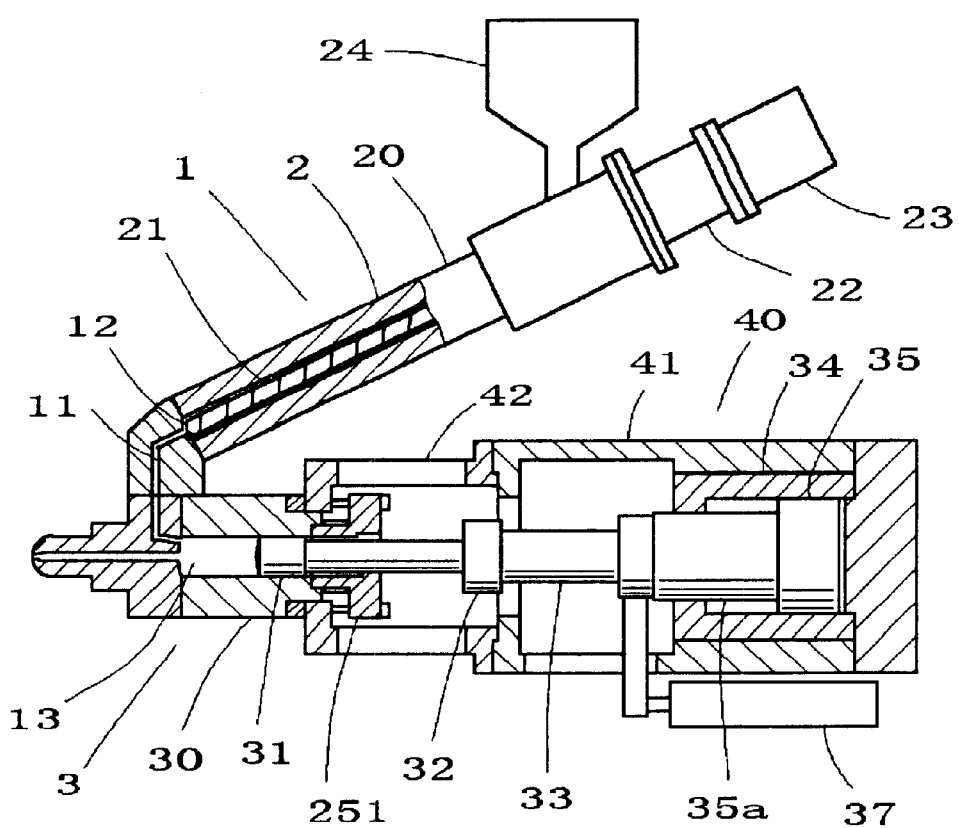
FIG. 4 is an overview showing a partial section of the plunger-type injection molding machine injection device relating to a second embodiment of the present invention.

An injection device 1 of the screw preplasticizing injection molding machine being equipped, as shown in FIGS. 1 and 4, with a plasticizing section 2 and an injection section 3; a plasticizing chamber 12 formed inside a plasticizing cylinder 20 in the plasticizing section 2, and an injection chamber 13 formed inside an injection cylinder 30 in the injection section 3, are connected by means of a connecting path 11.

A check mechanism 22 containing a hydraulic piston is connected to the rear edge of the plasticizing cylinder 20, and a rotational drive device 23 such as a hydraulic motor is connected thereto. The rear edge of the plasticizing screw 21 contained in the plasticizing chamber 12 is linked to the check mechanism 22 hydraulic piston. The hydraulic piston is further linked to the rotational drive device 23 hydraulic motor, enabling the plasticizing screw 21 to rotate and to advance and retract inside of the plasticizing cylinder 20. The hopper 24 is connected to the plasticizing chamber 12. Resin is supplied from the hopper 24 to the plasticizing chamber 12.

The injection cylinder 30 is connected to the injection drive mechanism 40 housing 41 by the connecting piece 42. Of course, the connecting piece 42 may also be formed integrally with the housing 41; it is not necessary to separate it from the housing 41. The injection hydraulic cylinder 34 is fixed within the housing 41, and the injection piston 35 is attached therein so as to be able to advance and retract. The injection plunger 31 contained within the injection chamber 13 is connected to the linkage rod 33 by the coupling 32 at the rear edge thereof, and the linkage rod 33 is affixed to the injection piston 35 ram 35a tip. The injection plunger 31 is able to advance and retract within the injection cylinder 30.

With the above construction, the resin introduced from the hopper 24 is plasticized and fed forward by the heat of the plasticizing cylinder 20 band heater (not shown) and the rotation of the plasticizing screw 21. At this point, the hydraulic pressure exerted by the check mechanism 22 operating oil is released and the plasticizing screw retracts due to the reaction force of the molten resin which is fed forward through the connecting path 11. Molten resin which has passed through the connecting path 11 is fed to the injection cylinder 30, and the injection plunger 31 is caused to retract. The position of the retracting injection plunger is measured by a position detection device 37 such as a linear encoder, and the molten resin is measured. When metering is completed, the plasticizing screw 21 is caused to advance by the pushing force exerted by the check mechanism 22, and the connecting path 11 is closed, which is to say checked. Injection is then performed by advancing the injection hydraulic cylinder 34 injection piston 35. This action is repeated during molding operations.

Figure 2:
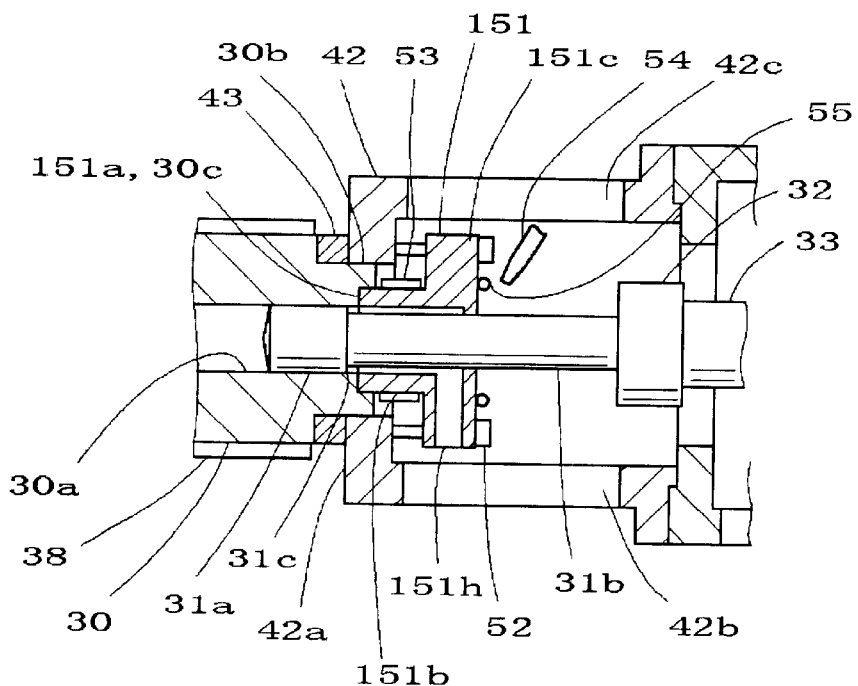
FIG. 2 is a section showing a vertical section along the center axis of the ejection guide and the structure in the vicinity thereof.
Figure 5:
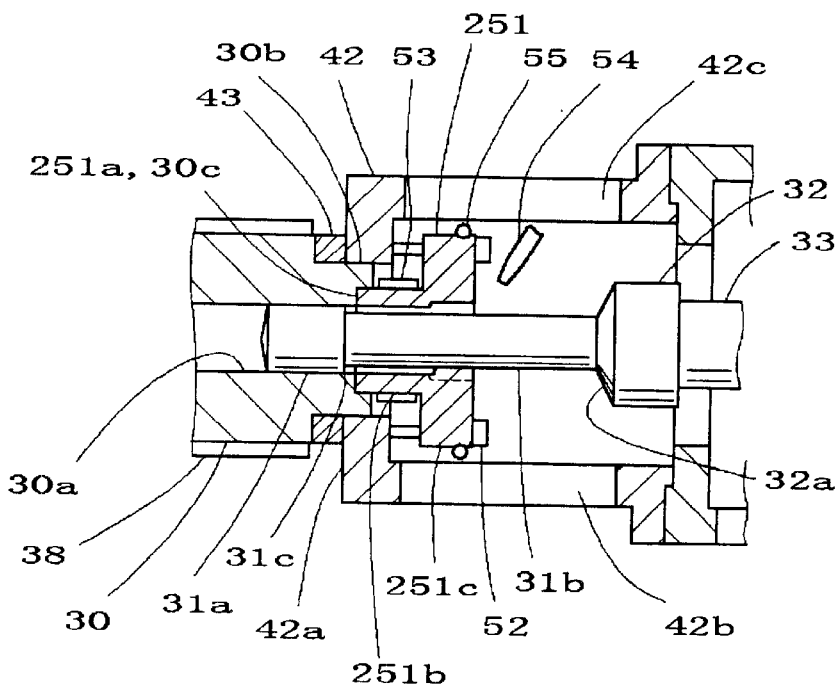
FIG. 5 is a section showing a vertical section along the center axis of the ejection guide and the structure in the vicinity thereof.

The diameter of the injection plunger 31 plunger head 31a, as shown in FIG. 2 and FIG. 5, is slightly larger than the plunger shaft 31b, and a stepped portion 31 is formed having approximately 0.2 mm between the diameters of the plunger head 31a and the plunger shaft 31b. Also, an approximately 0.02 mm gap is maintained as the difference between the inside diameter of the injection cylinder 36 inner wall 30a and the outside diameter of the plunger head 31a. This is so that the plunger head 31a does not bite into the injection cylinder 30 during injection operations. For this reason, an extremely slight quantity of molten resin may leak out of the gap between the plunger head 31a and the injection cylinder 30 and build up in the gap between the plunger shaft 31b and the injection cylinder 30. The amount of this leaked resin differs somewhat depending on molding resin or upon molding temperature, but is in practice a minute amount; approximately 0.03%–0.1% of the injection amount per cycle. During long molding operations, molten resin may repeatedly leak out, and the leaked resin move and become deposited around the plunger shaft 31b in the injection cylinder 30. An ejection opening, which ejects the leaked resin from inside to outside the injection cylinder 30, is therefor provided as described below.

The structure of the ejection opening and its surroundings will be explained. A small diameter cylindrical portion 30b, which fits into the connecting piece 42 front edge 42a is formed at the rear edge portion of the injection cylinder 30. The cylindrical portion 30b is formed as an integral piece with the injection cylinder 30, and the small diameter cylindrical portion 30b is inserted into the connecting piece 42, and connects the insulating part 43, by means of a bolt (not shown) to the connecting piece 42. It is thus difficult for the temperature of the main body of the small diameter cylindrical portion 30b to be affected by the temperature of the injection cylinder 30. While not shown here, when the injection cylinder 30 is not equipped with a small diameter cylindrical portion 30b, the edge temperature of the injection cylinder 30 can be affected by the temperature of the injection cylinder itself at the edge of the injection cylinder. However, as discussed below, the ejection guide contacts the cylinder at the smaller diameter portions, so the effect of the temperature of the injection main body on the temperature of the ejection guide is reduced.

A drop opening 42b is provided on the bottom side of the connecting piece 42 cylindrical portion, through which ejected resin falls. On the top side of the connecting piece 42 an opening 42c is formed, having approximately the same shape as the drop opening 42b.

When molten resin is ejected from the injection cylinder ejection opening, it is ejected in a number of states, as described above. Therefore the ejection guide is provided with an ejection opening formed with the shapes described below.

FIGS. 1 through 3 depict an ejection guide 151 according to a first embodiment of the invention. FIGS. 4 through 7 depict an ejection guide 251 according to a second embodiment of the invention. The structures common to both embodiments, which will be represented using the first embodiment, will be discussed first.

The ejection guide 151 comprises a cylindrical portion 151b and a flange 151c; a front edge 151a on the cylindrical portion 151b fits into the engagement hole 30 on the rear edge surface of the small diameter cylindrical portion 30b. The flange 151c is fixed to the backside of the connecting piece 42 front edge 42a by a bolt 52. The ejection guide 151 is thus connected to the rear edge of the injection cylinder 30. The band heater 53, which is temperature controlled independently of the injection cylinder 30 band heater 38, is wound around the outer circumference of the ejection guide 151 cylindrical portion 151b.

As described above, the ejection guide 151 is smaller in mass than the injection cylinder 30, and also contacts the injection cylinder 30 small diameter cylindrical portion 30b with a smaller surface area. Also, the injection cylinder 30 contacts the connecting piece 42 by means of the small diameter cylindrical portion 30b and also through the insulating part 43. The ejection guide 151 is thermally isolated from heat conducted directly from the injection cylinder 30, and also from heat indirectly conducted via the connecting piece 42. The band heater 53, which controls the ejection guide 151 temperature independently of the injection cylinder 30 band heater 38, is wound around the outer circumference of the cylindrical portion 151b. There will be virtually no mutually deleterious effects when the ejection guide 151 and the injection cylinder 30 are independently temperature controlled. The structure described above is similar to that of a ejection guide 251 on a FIG. 5.

Figure 3A:
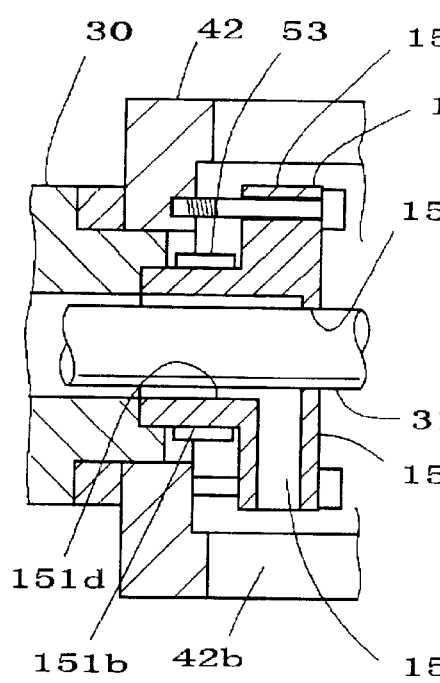
FIG. 3(a) is an expanded section of the ejection guide.
Figure 3B:
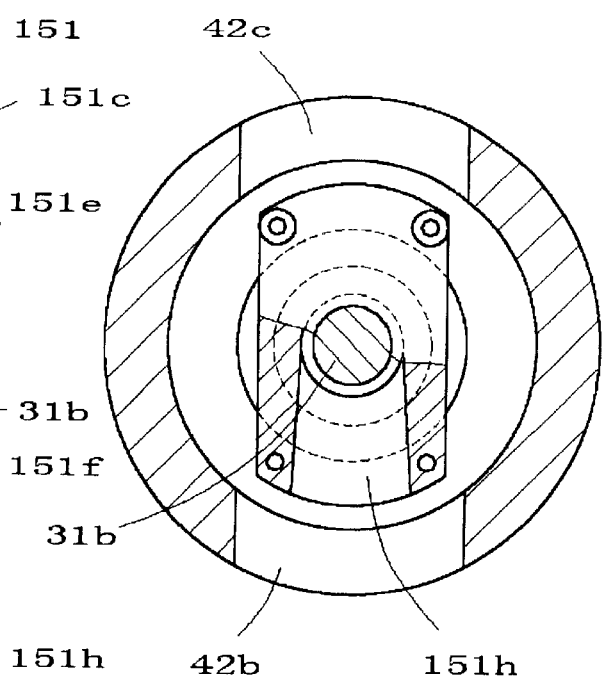
FIG. 3(b) is an expanded section seen from the rear (right side), cutting away a portion of the ejection guide and connecting part(s).

Next, the structures particular to the ejection guide according to the first embodiment will be explained. As shown in FIG. 3(a), the ejection opening 151 is formed on the ejection guide 151 flange 151c. This ejection opening 151h, as shown in FIG. 3(b), is a cut away hole which is wider at the bottom, and is positioned above the drop opening 42b. The diameter of the guide hole 151d in front (left side) of the ejection opening 151h is formed with dimensions approximately equal to or somewhat larger than the inside diameter of the injection cylinder 30. The diameter of the rear wall 151f guide hole 151 behind (right side) the ejection opening 151h is formed with dimensions which include a minute gap added to the outside diameter of the plunger shaft 31b.

In the ejection guide 151 as thus constituted, the band heater 53 controls the temperature of the molten resin independently of the injection cylinder 30, such that the molten resin is controlled to be reliably molten while inside the ejection guide 151. The molten resin ejected from the guide hole 151d is blocked by the rear wall 151f, and naturally hangs down and drops in the molten state from the ejection opening 151h. The ejected resin thus falls from the drop opening 42b without hardening and jamming in mid-course. Naturally, the ejection guide 151 is set at a temperature above that of the injection cylinder 30.

As explained above, the ejection guide 151 according to the first embodiment causes the resin to fall in a molten state, and is therefore appropriate for injection devices which mold thermally stable common resins. When changing materials from a high temperature melting resin to a low temperature melting resin, it is possible to adjust the ejection guide 151 temperature setting to that of the pre-changeover resin during the period until the pre-changeover resin has been completely ejected. By so doing, the pre-changeover molten resin can be ejected in a molten state from the ejection guide 151 during the period until the pre-changeover resin has been completely ejected, even after the injection cylinder 30 temperature has been set for the post-changeover resin, making it unnecessary to perform extra purges as before.

In this embodiment, a cooling means to cool the rear edge of the flange 151c may also be added. One example of a cooling means, as shown in FIG. 2, comprises a nozzle 54 which blows air onto the rear edge of the guide hole 151. Also, a cooling pipe 55 may be attached to the rear portion of the flange 151c. When such a cooling means is added, it is possible to reliably prevent the molten resin ejected into the ejection opening 151h from passing through the gap between the rear wall 151f guide hole 151e and the plunger shaft 31b and leaking backward. Also, even if the molten resin does leak, it is force cooled at this point, so the leaking backward progress of the leak will be reliably stopped. Of course cooling is not carried out to such an extent that resin within the ejection opening 151h is caused to harden due to cooling of the rear wall 151f.

Figure 6A:
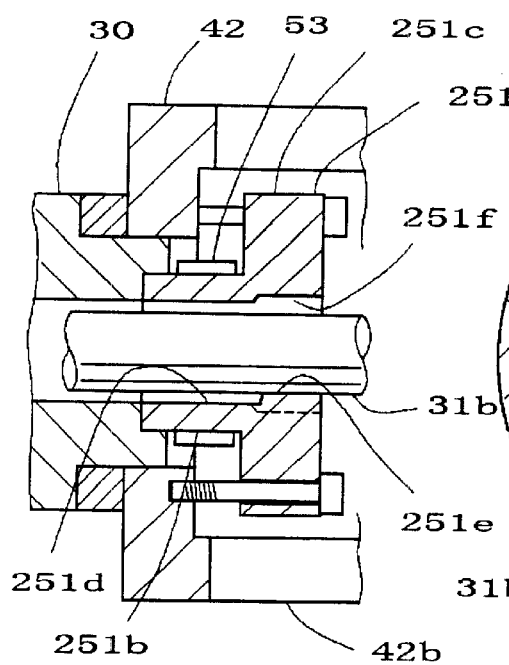
FIG. 6(a) is an expanded section of the ejection guide through arrows A—A in FIG. 6(b)
Figure 6B:
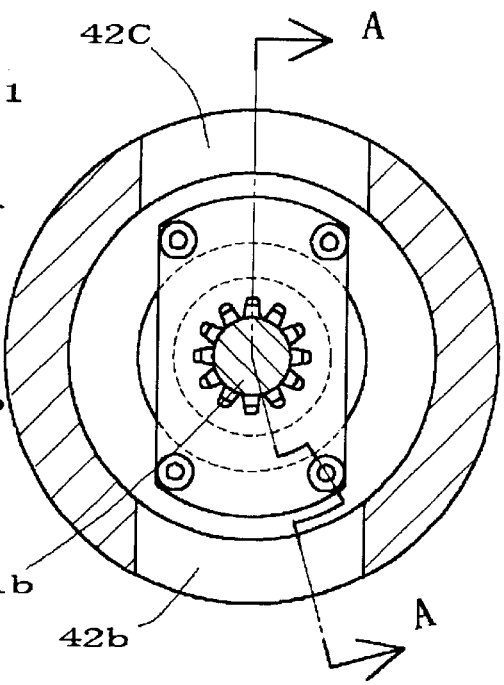
FIG. 6(b) is an expanded section of the connecting part cutting surface and the ejection guide, seen from the rear (right side).

Next, structures particular to the ejection guide according to the second embodiment will be discussed. As shown in FIG. 6, the guide holes 251d and 251e, penetrated by the injection plunger shaft 31b, are formed in the ejection guide 251. The inside diameter of the guide hole 251d in the approximately half side thereof (left side) which contacts the injection cylinder 30 is formed to be approximately equal to or somewhat larger than the inside diameter of the injection cylinder 30, and the rear half (right side) portion guide hole 251e cylindrical surface inside diameter is formed in a dimension which includes a minute gap added to the outside diameter of the plunger shaft 31b. Multiple ejection channels 251f are formed in the guide hole 251e cylindrical surface, parallel to the cylinder axial center. The rear edge surface (right side edge surface) of the flange 251c is positioned above the drop opening 42b so that the resin ejected from these ejection channels 251f can easily fall.

Figure 7:
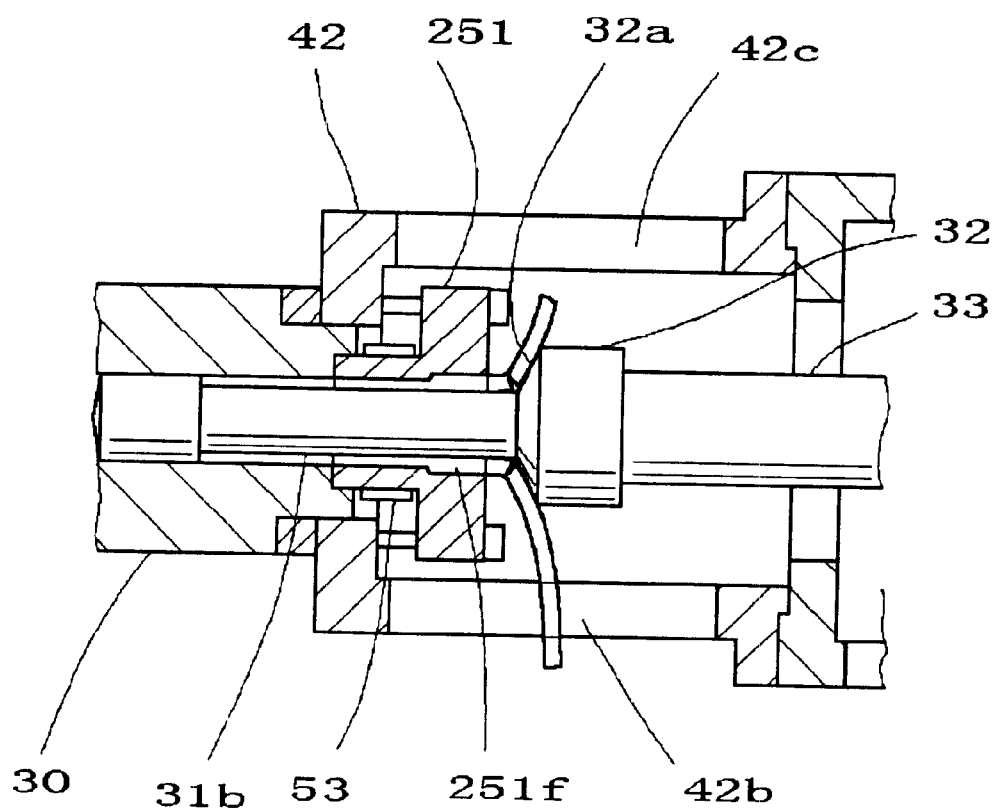
FIG. 7 is a section showing the resin in the ejected state achieved by the ejection guide.

In the ejection guide 251 thus constructed, as shown in FIG. 7, the molten resin hardens and is ejected in a state wherein it is divided into multiple fine strands upon exit from the ejection guide 251 ejection channels 251f. At this point, the band heater 53 controls the resin temperature independently of the injection cylinder 30. The temperature is controlled in such a way that fluidity of the molten resin is maintained while the resin is in the ejection guide 251 guide hole 251d, and such that when the resin is divided into fine strands just upon ejection from the ejection channels 251f. These strands harden enough so that they do not adhere to one another. The ejected resin thus spreads out radially in fine strands around the plunger shaft, hanging down into the drop opening 42b. Finally, the strands break off and fall by the advancement and retraction of the injection plunger 31.

As explained above, the ejection guide 251 according to the second embodiment is appropriate in cases in which molding temperatures are controlled within a narrow range, as when using engineering plastics or super engineering plastics materials, or when using resins into which additives are mixed, or when the amount of injection is extremely small for each molding. The ejection guide 151 temperature setting is never raised above the injection cylinder 30 setting, so there is no need to worry about thermal degradation.

In the embodiment shown in FIG. 5, a cooling means is added which cools the vicinity of the ejection guide 251 ejection channels 251f outlet such, that the ejected resin reliably cools. As an example of the cooling means, a nozzle 54 may be added which cools by blowing air toward the ejection channels 251f outlet area. A cooling water pipe 55, which winds around the flange portion, may be attached. By so doing, the fine strand resin that is ejected from the ejection channels 251f will be reliably ejected in a hardened state, so adjacent fine strands will not adhere to one another. Of course, the ejected resin is in a fine strand form, so that it hangs down and reliably falls even if completely hard.

It is also possible in this embodiment to impart a tapered form to the front surface 32a of the coupling 32 which connects the injection plunger 31. By so doing, as shown in FIG. 7, the fine stranded ejected resin is forcibly pushed and spread outward at the coupling front surface 32a when the injection plunger 31 advances, so that the ejected resin easily breaks off and falls.

As described below, selection and installation on the injection device of either the ejection guide 151 according to the first embodiment or the ejection guide 251 according to the second embodiment, in accordance with the various states in which the leaked resin is ejected, enables reliable ejection of the ejected resin from the ejection opening.

In order that the first embodiment ejection guide 151 and the second embodiment ejection guide 251 may be use for their respective purposes, it is preferable to enable easy exchange between the two ejection guide types, that is between the ejection guide 151 and the ejection guide 251. For this reason the first embodiment ejection guide 151 and the second embodiment ejection guide 251 are preferably formed having identical shapes and dimensions, and the fitting portion dimensions of the injection cylinder 30 small diameter cylindrical portion 30b and the connecting piece 42 fitting to which these are attached are also preferably identical. Using a two part structure in which two halves of the coupling 32 are assembled, makes it easy to remove the coupling 32 from the upper opening 42c and the lower drop opening 42b.

As noted above, when the ejection guides are structured so as to be interchangeable, changeover of the ejection guide is accomplished as follows. The procedure for removing the ejection guide 151 will be discussed first. The procedure for removing the ejection guide 251 is similar.

The coupling 32 is stopped at a position at which it is easy to remove it from the connecting piece 42 upper opening 42c and lower drop opening 42b. Then the coupling 32 is divided into two halves at the dividing face, which is not shown and are removed from openings 42b and 42c. Next, after retracting the linkage rod 33, the bolt 52 is removed. Wiring or piping to the band heater or other heating control means connected to the ejection guide 151 is cut off, and the ejection guide 151 is pulled rearward along the injection plunger 31, and is brought out from the upper opening 42c or the lower drop opening 42b. Thus, it is possible to remove the ejection guide 151 by a simple breakdown operation.

Next we shall explain the procedure for attaching the ejection guide 251. The procedure for attaching the ejection guide 151 is similar. First, the ejection guide 251 is inserted from the ejection guide 251 upper opening 42c or the lower drop opening 42b. Then it is fit into the injection plunger 31 and moved, such that the ejection guide 251 is caused to contact the injection cylinder 30. The bolt 52 is then tightened and the ejection guide 251 secured. Any wiring or piping to the band heater or other heat control means connected to the ejection guide 151 is then connected. Next, the linkage rod 33 is advanced, the injection plunger 31 rear-edge and the linkage rod 33 are combined, and the coupling 32 is attached. The attachment procedure is thus the reverse of the removal procedure, and is free of any difficulty. As noted above, many different ejected resin ejection conditions can be addressed by making the first ejection guide and second ejection guide of the present invention interchangeable.

What is claimed is:

1. A plunger-type injection molding machine injection device, in which molten resin in an injection cylinderinjection-chamber is injected by means of an injection plunger, comprising:

first and second ejection guides being attached interchangeably at a rear edge of said injection cylinder with a flange portion fastened by screws, wherein said first ejection guide comprises:

an ejection guide having a cylindrical portion with a diameter smaller than the outside diameter of the rear edge of said injection cylinder, a flange portion, and a guide hole penetrated by an injection plunger shaft, said ejection guide including a resin ejection opening in said flange portion contacting said injection cylinder at said cylindrical portion, and said ejection guide being equipped at said cylindrical portion with a heating means by which temperature of said ejection guide is controlled independently of said injection cylinder, wherein the inside diameter of said guide hole on the front side of said resin ejection opening being formed so as to be approximately equal to or somewhat larger than the inside diameter of said injection cylinder, and the inside diameter of said guide hole on the rear side of said resin ejection opening being dimensioned so as to form a minute gap relative to the outside diameter of said injection plunger shaft;

and wherein said second ejection guide comprises:

an ejection guide having a cylindrical portion with a diameter smaller than the outside diameter of the rear edge of said injection cylinder, a flange portion, and a guide hole penetrated by an injection plunger shaft, said ejection guide contacting said injection cylinder at said cylindrical portion, and said ejection guide being equipped at said cylindrical portion with a heating means by which temperature of said ejection guide is controlled independently of said injection cylinder; and a connecting piece for connecting said injection cylinder to an injection drive mechanism housing, said connecting piece having a drop opening on the bottom side thereof;

wherein said ejection guide being further formed such that the inside diameter of the front side of said guide hole is approximately equal to or somewhat larger than the inside diameter of said injection cylinder, and the inside diameter of the rear side of said guide hole being formed into a cylindrical surface and dimensioned to form a minute gap relative to said plunger shaft with multiple ejection channels formed on said cylindrical surface parallel to the axis thereof.

2. A plunger-type injection molding machine injection device, in which molten resin in an injection cylinder is injected by means of an injection plunger comprising:

an ejection guide having a cylindrical portion with a diameter smaller than the outside diameter of the rear edge of said injection cylinder, a flange portion, and a guide hole penetrated by an injection plunger shaft, said ejection guide including a resin ejection opening in said flange portion contacting said injection cylinder at said cylindrical portion, and said ejection guide being equipped at said cylindrical portion with a heating means by which temperature of said ejection guide is controlled independently of said injection cylinder, wherein the inside diameter of said guide hole on the front side of said resin ejection opening being formed so as to be approximately equal to or somewhat larger than the inside diameter of said injection cylinder, and the inside diameter of said guide hole on the rear side of said resin ejection opening being dimensioned so as to form a minute gap relative to the outside diameter of said injection plunger shaft.

3. A plunger-type injection molding machine injection device, in which molten resin in an injection cylinder is injected by means of an injection plunger comprising:

an ejection guide having a cylindrical portion with a diameter smaller than the outside diameter of the rear edge of said injection cylinder, a flange portion, and a guide hole penetrated by an injection plunger shaft, said ejection guide contacting said injection cylinder at said cylindrical portion, said ejection guide being equipped at said cylindrical portion with a heating means by which temperature of said ejection guide is controlled independently of said injection cylinder; and a connecting piece for connecting said injection cylinder to an injection drive mechanism housing, said connecting piece having a drop opening on the bottom side thereof;

wherein said ejection guide being further formed such that the inside diameter of the front side of said guide hole is approximately equal to or somewhat larger than the inside diameter of said injection cylinder, and the inside diameter of the rear side of said guide hole being formed into a cylindrical surface and dimensioned to form a minute gap relative to said plunger shaft with multiple ejection channels formed on said cylindrical surface parallel to the axis thereof.

4. A plunger-type injection molding machine injection device, in which molten resin in an injection cylinderinjection-chamber is injected by means of an injection plunger comprising:

an ejection guide at the rear edge of said injection cylinder;

a connecting piece for connecting said injection cylinder to an injection drive mechanism housing; and a coupling for connecting said injection plunger to a linkage rod of an injection hydraulic cylinder;

wherein said connecting piece having a drop opening on the bottom side thereof, said coupling having a tapered surface on the front surface thereof;

said ejection guide having a cylindrical portion with a diameter smaller than the outside diameter of the rear edge of said injection cylinder, a flange portion, and a guide hole penetrated by the said injection plunger shaft;

said ejection guide contacting said injection cylinder at said cylindrical portion and being equipped at said cylindrical portion with a heating means by which temperature of said ejection guide is controlled independently of said injection cylinder;

said ejection guide being further formed such that the inside diameter of the front side of said guide hole is approximately equal to or somewhat larger than the inside diameter of said injection cylinder, and the insider diameter of the rear side of said guide hole being formed into a cylindrical surface and dimensioned to form a minute gap relative to said injection plunger shaft with multiple ejection channels formed on said cylindrical surface parallel to the axis thereof.

5. The plunger-type injection molding machine injection device according to any one of claim 1 through 4, wherein said ejection guide being temperature controlled by a cooling means as well as by said heating means, said cooling means cooling a rear end of said flange portion with one of a nozzle or a cooling water pipe and said heating means heating said cylindrical portion with a heater.

\* \* \* \* \*